Dec. 1, 1959     K. G. ARABIAN     2,915,447
PARAFFIN WAX COMPOSITIONS HAVING IMPROVED FLEXIBILITY
Filed Feb. 28, 1955     3 Sheets-Sheet 1
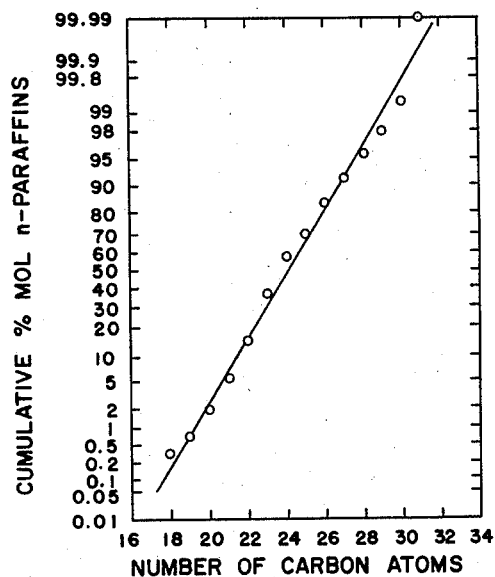
n-PARAFFIN DISTRIBUTION IN 100 DISTILLATE WAX
FROM MASS SPECTROMETER ANALYSIS
FIG. I
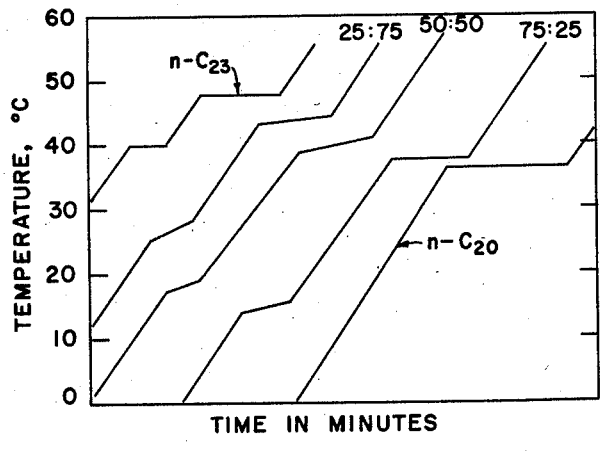
HEATING CURVES
FIG. II
INVENTOR:
KAREKIN G. ARABIAN
BY: *William H. Myers*
HIS AGENT

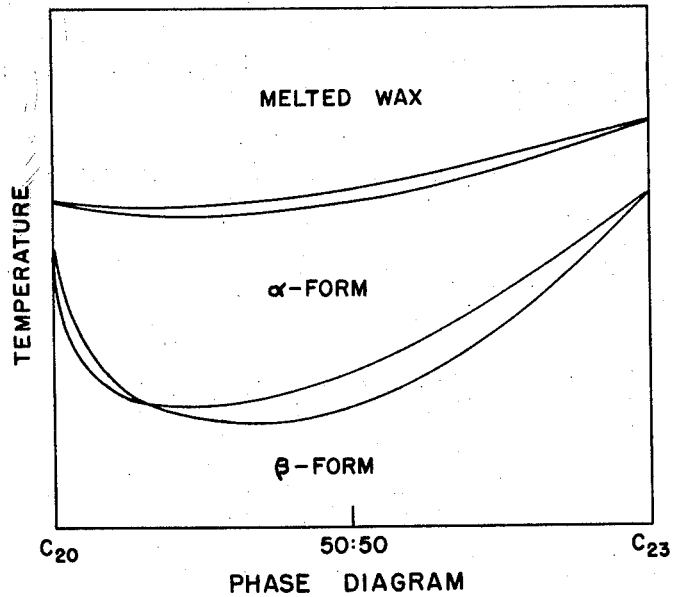
PHASE DIAGRAM
FIG. III
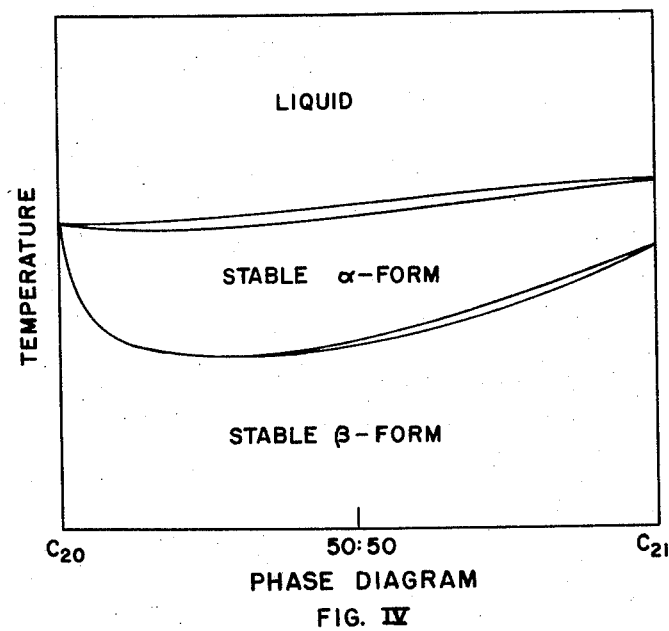
PHASE DIAGRAM
FIG. IV

Dec. 1, 1959 K. G. ARABIAN 2,915,447
PARAFFIN WAX COMPOSITIONS HAVING IMPROVED FLEXIBILITY
Filed Feb. 28, 1955 3 Sheets-Sheet 3
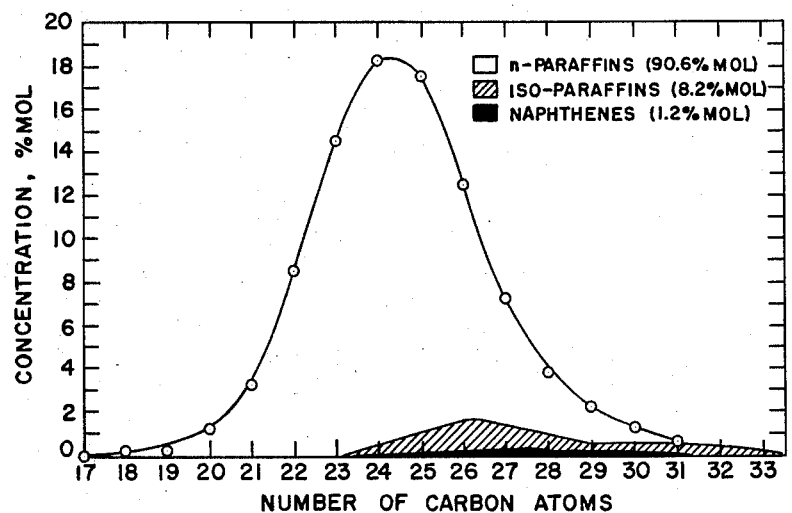
COMPOSITION OF 123F MP PARAFFIN WAX
FIG. V
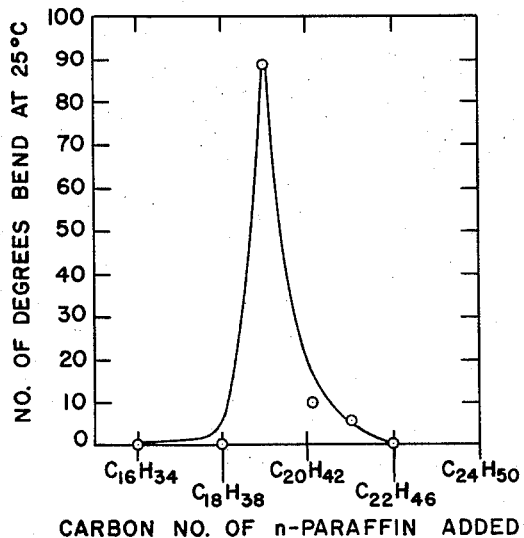
THE EFFECT OF 8% n-PARAFFIN OF VARIOUS MOL. WTS.
ADDED INDIVIDUALLY TO 138-140 FULL RANGE PARAFFIN WAX
(MEASURED BY BEND TEST 1/2" THICK SPECIMEN)
FIG. VI
INVENTOR:
KAREKIN G. ARABIAN
BY: *William H. Myers*
HIS AGENT

United States Patent Office 2,915,447
Patented Dec. 1, 1959

2,915,447

PARAFFIN WAX COMPOSITIONS HAVING IMPROVED FLEXIBILITY

Karekin G. Arabian, Houston, Tex., assignor to Shell Development Company, New York, N.Y., a corporation of Delaware Application February 28, 1955, Serial No. 490,980

4 Claims. (Cl. 208—21)

This invention relates to improved paraffin wax compositions. More particularly, it is concerned with wax compositions having improved flexibility.

Paraffin waxes, obtained usually from petroleum distillates, but in special instances from petroleum residues, comprise predominantly normal paraffin hydrocarbons with minor proportions of isoparaffins and naphthenes. The range of hydrocarbons present in paraffin waxes obtained from a given petroleum distillate is continuous with no gaps from the lowest to the highest members. Thus, the paraffin wax obtained by dewaxing a typical lubricating oil distillate from an East Texas crude; to produce a refined lubricating oil having a viscosity of 100 SUS at 100° F., contains normal paraffins having from 18 to 31 carbon atoms and, according to either fractional crystallization or spectrographic data, none of the intervening individual members is absent. Since the normal paraffins in ordinary paraffin wax obtained from the usual petroleum oil distillates comprise about 70–90% of the waxes, it will be understood that the physical properties of these normal paraffins, both individually and collectively, determine the average properties of the commercial wax product to a substantial extent.

Certain properties are desirable in paraffin waxes which make them useful for specific purposes including ductility, tensile strength, flexibility, softening point, melting point, and transition point. The properties of a wax suitable for a particular purpose such as bread wraps, and the like, are not necessarily those desirable for other uses wherein low temperatures are encountered, as in freezer wrappers or milk cartons.

Numerous additive materials and producing techniques have been utilized in attempts to improve one or more of the physical properties of various waxes. These have included the addition of microcrystalline, i.e. amorphous or residual, waxes to the paraffin waxes for certain purposes, but it has been found that the addition of microcrystalline wax to a paraffin wax merely results in a composition having intermediate properties between these two basic components. With respect to processing techniques, various recycling operations have been carried out so as to incorporate some of the softer waxes into the paraffin wax compositions, but the result is essentially the same as adding microcrystalline wax thereto. A further processing technique has been to fractionate a distillate wax into narrow cuts and re-blend non-adjacent cuts for the purpose of increasing the tensile strength of the compositions. This, of course, requires extensive plant processing and furthermore does not utilize the full range of waxes produced from a paraffin wax distillate.

It is an object of the present invention to improve paraffin wax compositions. It is a further object of this invention to improve the flexibility of paraffin waxes. It is a third object of this invention to modify paraffin waxes so as to produce their maximum flexibility at any given temperature at which flexibility is most desired. The foregoing objects will be more fully understood and other objects will become apparent from the description of the invention, which will be made with reference to the accompanying drawing, wherein:

In the accompanying drawings, Figs. I and V represent the normal paraffin distribution in typical full-range paraffin waxes; Fig. II shows the heating curves for two normal hydrocarbons and mixtures thereof; Figs. III and IV are phase diagrams of certain wax combinations; and Fig. VI shows the effect on flexibility of proceeding according to the invention to be described.

Now in accordance with the present invention, it has been found that the flexibility of paraffin wax compositions at a temperature T can be greatly improved by combining with a full-range paraffin wax between 5% and about 30% by weight, based on the combined product, of a straight chain (normal) paraffin wax A having between about 17 and 36 carbon atoms per molecule, such that a fraction B of the combined product comprising at least about 5% by weight thereof, has a melting point above T, and a transition temperature below T, and at least 50% of fraction B is wax introduced in wax A, and the combined product has an average melting point higher than T.

More particularly, the invention provides a method for the production of highly flexible paraffin waxes by the addition to a full-range paraffin wax, and especially those having less than 180° bend (as measured by the test described hereinafter) at temperature T, of between 5 and 30% by weight, based on the combined product, of a wax which either alone or in mixed crystal form with adjacent components of the full range paraffin wax will form a plasticizing fraction having maximum plasticity at about the temperature at which maximum flexibility is desired, so that at temperature T the composition has a bend (measured as described hereinafter) at least about 5° greater than that of the unmodified full-range wax.

In the discussion which follows, the following terms will be understood to have clearly defined meanings: paraffin waxes are understood to be those which in their most stable crystalline form are highly crystalline and normally brittle materials, predominating in normal paraffin hydrocarbons, and containing only small amounts, if any, of non-normal hydrocarbons. They are distinguished in this respect and other properties from the so-called amorphous or microcrystalline waxes, which are of much more complex structure and are normally to be found in the soft waxes or residual wax fractions. The term "full-range paraffin waxes" will be understood to mean a paraffin wax as obtained by a normal dewaxing procedure (usually followed by deoiling of the wax product separated by the dewaxing) from a lubricating oil distillate and containing normal paraffin hydrocarbons (and minor proportions of non-normal hydrocarbons) over a given range, say, from 18 to 39 carbon atoms, or for any shorter range within this broad spectrum without any of the intervening normal paraffins having been removed, such as shown in Figure I. The melting point of the wax is understood to be the average melting point as determined by a standard ASTM procedure. The transition temperature of a paraffin wax is that temperature at which the crystalline wax changes from the relatively plastic alpha form to the beta form. This property will be discussed more fully hereinafter.

Since it is from its solid state properties that a wax derives its commercial value, a higher wax melting point favors a wider range of practical applications; consequently, the wax melting point has been generally supposed to be an important factor in quality evaluation.

However, it has been determined that this conclusion is not altogether correct, especially in view of the fact that normal paraffins have been found to exist in at least two solid crystalline states. The crystalline states which are most important are the so-called alpha form, which is just below the melting point of the wax, and the beta form, which the wax crystal assumes at a temperature below that of the alpha form. The beta form of normal paraffins is the more stable of the two and the individual normal paraffin hydrocarbons when in the beta form are extremely brittle and exhibit substantially no ductility whatsoever. Individually, therefore, a single normal paraffin hydrocarbon wax is extremely weak. In the alpha form a small stress causes slipping of the soft crystals over each other, resulting in a certain elongation of the specimen before a break occurs. Below the transition temperature the extreme rigidity of the individual crystals results in a very brittle structure. The breaking strength below said transition temperature is equally low for all normal paraffins, in the order of 1–4 kilograms per square centimeter.

Mixed crystals change this property in that the depression of transition point below the melting point of the mixed crystal is substantially greater than that which exists for any of the individual members forming a part of the mixed crystal. In accordance with one aspect of the present invention, it has been found that mixed crystals are formed between normal paraffins having no more than about 4 carbon atoms difference between the molecules and that, within this range, the greatest depression in transition temperature occurs between the pairs of normal hydrocarbons having the greatest carbon atom difference (4) per molecule.

In the alpha form, the hydrocarbons are in the hexagonal system of crystallinity, thus forming crystals wherein the hydrocarbon molecules are attached side by side like hexagonal pencils, the long axes being perpendicular to the plane formed by the ends of the molecules. The molecules rotate freely about their long axes. In the beta form the crystals are in the orthorhombic system wherein the packing is no longer symmetrically hexagonal. Two unequal side spacings are shown and the molecules do not possess the freedom of rotation, but show vibration about their mean positions.

The point of transition is clearly manifested by the sharp discontinuity in the curve of hardness. In the alpha modification the crystal is much softer, owing to the rotation of the long chains about their axes, than in the beta modification. This rotation keeps the chains at a greater distance from each other. In the alpha form the coefficient of expansion is many times greater than in the beta form, and consquently, a sharp decrease in hardness occurs on slightly increasing the temperature. Because of this, normal paraffin hydrocarbons in their alpha form are semi-fluid plastic members, as opposed to the hard brittle crystalline state of the beta form.

The transition point of a wax may be readily determined experimentally by means of a heating or cooling curve of temperature versus time for a constant heat input. When heating an ordinary single normal paraffin (which is in the beta state) the temperature-time curve rises diagonally until the transtion point has been reached, at which time the curve bends to a substantially horizontal direction until all of the wax being tested has been converted from the beta to the alpha form. At this point the heating curve assumes a diagonal direction until the melting point is reached, at which time the heating curve again bends to the horizontal until all of the specimen has been melted. Thereafter, since the specimen is in the liquid state entirely, the heating curve again assumes the diagonal direction.

The horizontal portions of the curve denoting the transition temperature between alpha and beta forms and the melting point temperature are clearly defined. This will be seen in Fig. II which shows heating curves for normal $C_{20}$ paraffin hydrocarbon, normal $C_{23}$ paraffin hydrocarbon, as well as for three intermediate mixtures of these two individual members.

The significance of the mixture of hydrocarbons upon the melting point and the transition point will be seen by reference to Fig. III. In this figure, the upper curves represent the melting points of various mixtures determined by both heating and cooling. The lower curves ing Fig. III represent the transition points of various mixtures of $C_{20}$ and $C_{23}$ normal hydrocarbons. Note that a maximum depression of the transition temperature occurs when $C_{20}$ is mixed with $C_{23}$ in a ratio of approximately 9:1 and that mixtures between about 9:1 and about 1:1 exhibit a wide temperature region of alpha-form. Note furthermore that a difference between the transition temperature and melting point for the mixtures is substantially greater than for either of the individual wax members alone. Thus, it will be evident that a means may be found for depressing the transition temperature and thus permitting a wider area to exist wherein the plastic alpha form of the crystals is present.

It has been found, however, that the proportion of any one individual wax member present in a full-range distillate wax is seldom (if ever) sufficient to provide the desired large degree of depression in the transition temperature. The present invention is designed to overcome this shortcoming of commercially produced full-range paraffin waxes. Table I presents pertinent physical data for individual normal alkanes:

TABLE I

| Normal Alkane | M. P., °C. | Transition Temperature, °C. |
|---|---|---|
| $C_{17}$ | 21.7 | 10.5 |
| $C_{18}$ | 27.5 | none |
| $C_{19}$ | 32.1 | 23.0 |
| $C_{20}$ | 36.6 | 36.2 |
| $C_{21}$ | 40.2 | 32.5 |
| $C_{22}$ | 44.0 | 42.0 |
| $C_{23}$ | 47.5 | 40.0 |
| $C_{24}$ | 50.5 | 48.3 |
| $C_{25}$ | 53.5 | 47.0 |
| $C_{26}$ | 56.5 | 53.3 |
| $C_{27}$ | 59.0 | 53.3 |
| $C_{28}$ | 61.6 | 58.0 |
| $C_{29}$ | 63.6 | 58.2 |
| $C_{30}$ | 65.4 | 62.0 |
| $C_{36}$ | 75.7 | 73.5 |

Several things are noteworthy from the properties given in the Table I. First, a substantial difference exists between melting point and transition temperature of the individual normal alkanes having an odd number of carbon atoms per molecule. Contrasted to this, it will be seen that the individual normal alkanes having an even number of atoms per molecule exhibit substantially no difference between the melting point and the transition temperature.

In its preferred form the present invention comprises the addition of one or more waxes to a full-range paraffin wax such that the combined composition contains a sufficient number of paraffin wax crystals having a transition temperature below, but a melting point above, the temperature at which maximum flexibility of the combined composition is desired. It will be understood that this can be effected in two principal ways. First, the combined composition may comprise a full-range paraffin wax to which has been added a normal paraffin hydrocarbon (or narrow range mixture thereof) which is discontinuous with the series of normal paraffins present in the full-range paraffin wax. This would occur, for example, by the combination of normal nonadecane with the full-range paraffin wax obtained from a medium boiling distillate which contains normal paraffins having from about 23 to about 36 carbon atoms per molecule. Under these circumstances, and when the normal nonadecane is present in an amount between about 5% and about 30% by weight of the combined fractions, the composition will have its most desirable flexibility characteristics at a temperature between about 23° and about 32° C. This is due to the fact that the proportion of normal nonadecane added to the full-range paraffin wax is sufficient to plasticize the entire wax combination when the nonadecane is in the alpha form. According to Table I, it will be seen that the alpha form exists between 23° (the transition temperature) and 32.1° C. (the melting point).

The situation is complicated substantially if the added paraffin wax is less than about 3 carbon atoms difference in length from the closest individual members present in the full-range paraffin wax. Under these conditions, mixed crystals may form between the added wax and the more nearly adjacent members of the full-range wax. The depression in transition temperature of these mixed crystals is such as to spread out the area wherein the alpha form exists and thus to enable a greater plasticizing action of the combined waxes to occur. This will be evident by reference again to Fig. III.

The ability to co-crystallize with adjacent members in the normal hydrocarbon series means that even the even-numbered normal alkanes may be utilized in accordance with the present invention, since the co-crystallization of even-numbered normal paraffins with adjacent normal paraffins causes a difference to be created between the transition temperature and the melting point where no difference occurs in the pure even-numbered alkanes. This can be seen by reference to Fig. IV which represents the phase diagram of mixtures of $C_{21}$ and $C_{20}$ normal alkanes. As will be seen by reference to the melting points and transition points in Table I, there is no difference between these two properties of normal $C_{20}$ alkane. There is a relatively small difference between the two properties of the corresponding normal $C_{21}$ alkane. However, when these two are mixed in varying proportions as Fig. IV shows, there is a substantial depression in the transition temperature and the maximum depression occurs wherein approximately nine parts of $C_{20}$ are mixed with about one part of $C_{21}$. This illustrates the aspect of this invention that if the normal hydrocarbon added to the full-range hydrocarbon is present in a sufficient amount, i.e. 5–30% by weight of the combined wax, and the full-range wax contains a sufficient proportion of hydrocarbons—less than about three carbon atoms different in length from normal $C_{20}$, then a relatively wide temperature range wherein the alpha form (the plastic state) is present in a plasticizing amount will exist and the wax composition will have an improved flexibility. The precise temperature at which this improved flexibility will occur will depend upon two principal factors, namely, the proportion of $C_{20}$ added, and the identity and proportion of the nearly adjacent hydrocarbons present in the full-range paraffin wax.

The data contained in Table I indicate that a second member may be added, in an amount of at least 5% by weight of the combined waxes, to a full-range paraffin wax, so as to obtain high flexibility at a desired temperature. It is true, as will be seen from the full-range paraffin wax composition curves in Figs. I and V and described hereinafter, that the full-range wax contains certain adjacent wax members in an amount sufficient to provide a limited degree of flexibility at a given temperature. But the present invention provides far greater flexibility and effect by the calculated addition of the precise normal paraffin to a given full-range paraffin wax so as to produce, or enhance, flexibility at any specifically desired temperature.

For example, and by way of illustration, it may be assumed, first, that flexibility is desired for a particular use at a temperature of 42° C., and secondly, that a full-range paraffin wax having an average melting point in the order of 50° C. is to be modified for this purpose. Reference to Table I will show that the optimum normal paraffin to be added in an amount of between 5 and 30% by weight of the final composition, in accordance with this invention, should be the normal $C_{23}$ alkane, having a transition temperature of 40° C. and a melting point of 47.5° C. Hence, since flexibility is desired at a temperature of 42° C., this added wax provides the plasticizing effect essential for a high degree of flexibility in the full-range wax. This effect will be provided even if the full-range wax contains only normal paraffin waxes which are relatively non-adjacent to the $C_{23}$ normal alkane, or if the $C_{23}$ added wax is adjacent to individual members of the full-range wax. The greatest effect, of course, will be found by utilizing the present invention to enhance the flexibility of a full-range wax at a specified temperature which is outside the alpha-form range of any of the major components of the full-range wax.

This will be understood more fully by reference to Fig. V, which shows the distribution of hydrocarbons throughout a typical full-range paraffin wax obtained from a medium-low viscosity lubricating oil distillate. It will be seen by reference to this figure that the proportions of isoparaffins and of naphthenes are negligible; also, that the proportions of normal alkanes having from 17 to 21 carbon atoms and from 28 to 31 carbon atoms are less than 4% for each of the individual members. Now, if high flexibility is desired at a temperature of 25° C., this full-range paraffin wax will fail to pass a flexibility test. This is due to the fact that at 25° C. (see Table I), the wax contains entirely too small percentages of the waxes which will be in the alpha form at the temperature at which maximum flexibility is desired. This illustrates the advantage which would be gained by preferred use of the present invention, wherein a full-range paraffin wax is modified by 5 to 30% by weight of the wax composition of an additive wax which will enhance the proportion of at least one of the waxes present in the full-range wax present therein originally in a proportion less than about 5%. For example, if the full-range wax shown in Fig. V is modified with about 5% of normal $C_{19}$ hydrocarbon, the flexibility at the specified temperature of 25° C. will be greatly enhanced, since at this temperature the added $C_{19}$ is in the alpha form, as will be found by reference to the transition-melting point table (Table I).

The data in Table II show the weight- and mol-percent of the individual normal paraffins present in two typical distillate full-range paraffin waxes.

TABLE II

Distribution of n-paraffins in commercial waxes as analyzed by mass spectrometer

[Basis: 100% n-Paraffins]

| n-Paraffin | 123° F., M.P., Wax | | 138.8° F., M.P., Wax | |
|---|---|---|---|---|
| | Percent w. | Mol Percent | Percent w. | Mol Percent |
| $C_{18}$ | 0.2 | 0.3 | | |
| $C_{19}$ | 0.2 | 0.3 | | |
| $C_{20}$ | 1.0 | 1.2 | | |
| $C_{21}$ | 3.0 | 3.5 | | |
| $C_{22}$ | 8.3 | 9.3 | | |
| $C_{23}$ | 15.0 | 16.0 | 1.4 | 1.7 |
| $C_{24}$ | 19.7 | 20.2 | 3.2 | 3.8 |
| $C_{25}$ | 19.5 85.7 | 19.2 86.3 | 6.8 | 7.8 |
| $C_{26}$ | 14.5 | 13.7 | 10.5 | 11.5 |
| $C_{27}$ | 8.7 | 7.9 | 12.5 | 13.2 |
| $C_{28}$ | 4.7 | 4.1 | 13.0 | 13.3 |
| $C_{29}$ | 2.7 | 2.3 | 13.4 70.9 | 13.2 72.4 |
| $C_{30}$ | 1.6 | 1.3 | 11.2 | 10.7 |
| $C_{31}$ | 0.9 | 0.7 | 10.3 | 9.5 |
| $C_{32}$ | | | 7.0 | 6.3 |
| $C_{33}$ | | | 4.5 | 3.9 |
| $C_{34}$ | | | 3.2 | 2.7 |
| $C_{35}$ | | | 1.6 | 1.3 |
| $C_{36}$ | | | 1.4 | 1.1 |

In illustrating a specific application of the present invention, and to indicate the expected and highly effective results obtained by application of the invention to a specific wax mixture, the second of the two waxes described in Table II was modified by the addition thereto of 8% by weight of the final mixture of individual normal paraffins having from 16 to 22 carbon atoms per molecule. Fig. VI shows the results obtained by testing these modified waxes at a test temperature of 25° C. The bend test is performed by casting a specimen one-half inch thick in a Perkins tensile strength mold, allowing the specimen to stand for three hours in a constant temperature room at 25° C. and then bending manually. The degrees through which the specimen may be bent prior to breaking is recorded. In order to pass this test, the specimen must bend at least 4 degrees. As Fig. VI shows, the addition of either a $C_{16}$, $C_{17}$, $C_{18}$ or $C_{22}$ normal alkane to this particular full-range paraffin wax resulted in no beneficial effect upon the flexibility of the combined wax composition. However, the addition of $C_{19}$ n-alkane resulted in an outstanding increase in the flexibility of the full-range wax, and the addition of a $C_{20}$ or a $C_{21}$ n-alkane enabled the modified composition to pass the bend test, although the increase in flexibility was of a minor order.

The explanation of these phenomena will be understood more fully by a view of the theoretical background for the present invention, given hereinbefore and specifically by reference to the transition point-melting point table, also given hereinbefore. Since the alpha form of $C_{19}$ is that which exists at the test temperature of 25° C., and since the alpha form of the other additive waxes occurs at temperatures other than the test temperature, the reason for the outstanding results using $C_{19}$ in this particular case will now be understood. The beneficial but minor effects of $C_{20}$ and $C_{21}$ can be accounted for by mixed crystal formation occurring between the added waxes and the minor amounts of individual adjacent or near adjacent members present in the full-range wax being modified. It will be understood that if the test temperature had been, for example, at 42° C. instead of 25° C., then the most effective additive wax would have been $C_{23}$ n-alkane.

It is essential for the success of the present invention that the additive wax have a melting point above the temperature at which enhanced flexibility is desired. If the melting point of the additive wax is below this test temperature, then the resulting combined wax composition will have undesirable properties. It may, for example, be crumbly and similar to an undeoiled wax since the additive wax, if it is present above its melting point, will in fact be an oily liquid.

It will be noted that the wax modified in the tests presented graphically in Fig. VI had a melting point of about 138.8° F. The invention, of course, is not restricted to the use of this particular full-range wax and moreover, the effect of the addition of normal $C_{19}$ is not confined to the improvement of this particular wax. The effect of normal $C_{19}$ as an additive wax is, on the contrary, dependent upon the correlation between the temperature at which enhanced flexibility is desired and the temperature range in which normal $C_{19}$ is in the alpha form. This is demonstrated by the modification of a full-range paraffin wax having a melting point of about 126° F. with 20% by weight, of the final composition, of normal $C_{19}$. While the unmodified full-range paraffin wax is brittle at the test temperature of 25° C., the combined composition can be bent more than 180 degrees without breaking. This is true also when 20% of the normal $C_{19}$ is added to the 138.8° F. melting point full-range paraffin wax. Comparison of these data with the results obtained by the addition of the same normal alkane in an amount of 8% (see Fig. VI) will indicate the advantages gained by adding proportionately higher amounts of the additive material.

It will be understood, of course, that it is unnecessary to add pure individual hydrocarbons as the additive flexibility-improving wax. It is preferred, however, that the additive wax be one having a relatively narrow range of individual wax members and that more than 50% of the additive wax should have a normal paraffin spread of not more than about four carbon atoms. For example, the addition of 10% of a "gas oil wax," from a straight run gas oil distillate from East Texas crude, to the same 126° F. melting point full-range paraffin wax provided a Bend test of 5 degrees. The gas oil wax had the following composition:

*Composition of wax from gas oil*

| Carbon Number of n-Paraffin | Concentration of Each n-Paraffin, Percent v. |
| --- | --- |
| $C_{17}$ | 1.2 |
| $C_{18}$ | 4.0 |
| $C_{19}$ | 10.9 |
| $C_{20}$ | 19.5 |
| $C_{21}$ | 23.0 |
| $C_{22}$ | 17.7 |
| $C_{23}$ | 10.4 |
| $C_{24}$ | 3.7 |
| | 90.4 |

Percent non-normal paraffins = 9.6%.

Due to the fact that the normal alkanes having an even number of carbon atoms per molecule have a transition point which is substantially identical with the melting point of the wax, the individual even-numbered alkanes are highly brittle materials at any temperature. However, as pointed out hereinbefore, this does not prevent their use in full-range paraffin waxes, especially where the full-range wax contains minor amounts of normal alkanes which are less than about three atoms removed from the carbon length of the additive wax. This is illustrated by the modification of the full-range paraffin wax having a melting point of 138.8° F. with 5% by weight of normal $C_{20}$ alkane. In spite of the fact that both the additive wax and the full-range wax were brittle at the test temperature of 25° C. (snapping after less than one degree bend), the combined composition could be bent at least 45 degrees before breaking. This is, of course, due to the depression of the transition point by the formation of mixed crystals.

While the present invention can be applied particularly to full-range paraffin waxes having a carbon atom spread of 18 to 39 carbon atoms per molecule, it can be applied to other paraffin wax mixtures having an even wider or narrower carbon atom range. For example, the full-range wax having a melting point of about 123° F. has a continuous range of normal paraffins from about $C_{18}$ to about $C_{30}$. Also the full-range paraffin wax having a melting point of about 138.8° F. has a carbon atom range from about $C_{22}$ to about $C_{39}$. The most effective additive waxes for the production of maximum flexibility at temperatures commercially usable today are the normal alkanes having between about 19 and 22 carbon atoms per molecule. The present invention especially provides a means for imparting flexibility to a full-range wax at a temperature whereat the latter is not completely in the alpha form.

I claim as my invention:

1. A wax composition comprising 70–95% by weight of a continuous series of normal paraffin hydrocarbons having from about 18 to about 31 carbon atoms per molecule, the individual $C_{18-21}$ hydrocarbons being present in an amount less than about 5% by weight each and 5–30% of normal nonadecane, said composition having a greater flexibility at a temperature between 23.0° C. and 32.1° C. than that of the continuous series of hydrocarbons in the absence of the added nonadecane.

2. A wax composition comprising 70–95% by weight of a continuous series of normal paraffin hydrocarbons having from about 18 to about 31 carbon atoms per molecule, the individual $C_{18-21}$ hydrocarbons being present in an amount less than about 5% by weight each and 5–30% of normal eicosane, said composition having a greater flexibility at a temperature between 23.0° C. and 32.1° C. than that of the continuous series of hydrocarbons in the absence of the added eicosane.

3. A wax composition comprising 70–95% by weight of a continuous series of normal paraffin hydrocarbons having from about 18 to about 31 carbon atoms per molecule, the individual $C_{18-21}$ hydrocarbons being present in an amount less than about 5% by weight each and 5–30% of normal $C_{21}$ paraffin hydrocarbon, said composition having a greater flexibility at a temperature between 23.0° C. and 32.1° C. than that of the continuous series of hydrocarbons in the absence of the added $C_{21}$ paraffin hydrocarbon.

4. A wax composition comprising 70–95% by weight of a continuous series of normal paraffin hydrocarbons having from about 18 to about 31 carbon atoms per molecule, the individual $C_{18-21}$ hydrocarbons being present in an amount less than about 5% by weight each and 5–30% of normal $C_{19-21}$ paraffin hydrocarbons, said composition having a greater flexibility at a temperature between 23.0° C. and 32.1° C. than that of the continuous series of hydrocarbons in the absence of the added $C_{19-21}$ paraffin hydrocarbons.

References Cited in the file of this patent

UNITED STATES PATENTS

| | | |
|---|---|---|
| 2,361,582 | Adams et al. | Oct. 31, 1944 |
| 2,394,833 | Young et al. | Feb. 12, 1946 |
| 2,443,221 | Bergstem | June 15, 1948 |
| 2,467,959 | Bowman et al. | Apr. 19, 1949 |
| 2,668,140 | Arabian | Feb. 2, 1954 |
| 2,670,323 | Hunter et al. | Feb. 23, 1954 |
| 2,756,180 | Perry et al. | July 25, 1956 |
| 2,761,814 | Post | Sept. 4, 1956 |
| 2,810,678 | Effron | Oct. 22, 1957 |
| 2,819,185 | Mack et al. | Jan. 7, 1958 |

FOREIGN PATENTS

| | | |
|---|---|---|
| 621,923 | Great Britain | Apr. 22, 1949 |